United States Patent
Webb et al.

(10) Patent No.: US 7,917,669 B2
(45) Date of Patent: Mar. 29, 2011

(54) MULTIPHASE ADDRESSING METHOD FOR TRANSFERRING ADDRESS INFORMATION

(75) Inventors: Neil Webb, Surrey (GB); Ashley Crawford, Surrey (GB); Mike Jager, Surrey (GB)

(73) Assignee: Nokia Corporation, Espoo (FI)

( * ) Notice: Subject to any disclaimer, the term of this patent is extended or adjusted under 35 U.S.C. 154(b) by 478 days.

(21) Appl. No.: 11/630,418

(22) PCT Filed: Jun. 30, 2004

(86) PCT No.: PCT/IB2004/002161
§ 371 (c)(1),
(2), (4) Date: Nov. 21, 2007

(87) PCT Pub. No.: WO2006/010975
PCT Pub. Date: Feb. 2, 2006

(65) Prior Publication Data
US 2008/0195775 A1   Aug. 14, 2008

(51) Int. Cl.
*G06F 3/00*   (2006.01)
(52) U.S. Cl. ............... 710/29; 710/33; 710/61
(58) Field of Classification Search ............ 710/1, 3, 710/4, 29, 33–35, 46, 58, 61; 711/200, 211
See application file for complete search history.

(56) References Cited

U.S. PATENT DOCUMENTS

| 4,315,308 A | 2/1982 | Jackson | 364/200 |
| 5,758,188 A * | 5/1998 | Appelbaum et al. | 710/35 |
| 5,911,056 A | 6/1999 | Faget et al. | 395/309 |
| 6,463,490 B1 * | 10/2002 | Wang et al. | 710/110 |
| 7,299,329 B2 * | 11/2007 | Choi et al. | 711/167 |

FOREIGN PATENT DOCUMENTS
EP   0886220 A2   12/1998

OTHER PUBLICATIONS

"How to implement DDR SDRAM in the System", Samsung Electronics, J.H. Lee 4Q98 (Rev.0.0), Memory Application Team, 13 pages.
"PCI Local Bus Specification" PCI Local Bus Specification, Jun. 1, 1995, pp. I-XVI, 1, 1-4, 109-119, XP002251932.
"PCI-X Protocol Addendum to the PCI Local Bus Specification Revision 2.0", PCI-X Protocol Addendum to the PCI Local Bus Specification Revision 2.0 PCI-SIG, Jul. 29, 2002 (Jul. 9, 2002), pp. 1,2, 10, 20-44 (as provided by the EPO), XP007912529.

* cited by examiner

*Primary Examiner* — Alford W Kindred
*Assistant Examiner* — Richard B Franklin
(74) *Attorney, Agent, or Firm* — Harrington & Smith

(57) ABSTRACT

A method of performing a burst read access at a memory device using a multiplexed data/address bus and a control signal including transferring a first portion of address information in a first phase via the multiplexed data/address bus to the memory device; transferring second portion of address information in a second phase via a multiplexed data/address bus to the memory device; transferring a series of data words from the memory via the multiplexed data/address bus; toggling the state of the control signal at the memory device as each data word is transferred; and suspending the transfer of the series of data words from the memory via the multiplexed data/address bus and the toggling of the state of the control signal.

14 Claims, 2 Drawing Sheets

SUBSTITUTE SHEET (RULE 26)

MULTIPHASE ADDRESSING METHOD FOR TRANSFERRING ADDRESS INFORMATION

FIELD OF THE INVENTION

Embodiments of this invention relate generally to an interface between two integrated circuits e.g. a memory and microprocessor interface or a memory and DMA controller interface.

BACKGROUND TO THE INVENTION

One conventional microprocessor memory interface includes an address bus, a data bus, and a control bus. The microprocessor uses the address bus to send an memory address to the memory. The number of address signal lines in the address bus depends upon the number of addressable memory locations in the memory. The data bus is used to transfer data from the microprocessor to the memory during a write transaction and to transfer data from the memory to the microprocessor during a read transaction. The data bus typically has 8*n data signal lines, where n is a natural number. The control bus typically includes control signal lines such as write_enable (WE) that are used by the microprocessor to control the type of transaction at the memory (read or write) and such as a clock signal (clk) that is used to synchronise the transaction.

The current flash memory interface 10 used in NOKIA mobile telephones is illustrated in FIG. 1. The interface 10 has a dedicated 9-bit upper address bus 2 and a 16-bit multiplexed data/address bus 4. It also has a control bus 6 comprising: a system clock signal line (external clock) 3, a chip select signal line (CSX) 5, a read signal line (OEX) 7, an address valid signal line (ADVX) 9 and a Ready signal line 11.

During an initial phase of a memory access the dedicated address bus 2 conveys the 9 most significant address bits while the multiplexed bus 4 simultaneously conveys the 16 least significant address bits. The address bits are conveyed at the rising edge of a single external clock cycle. The address valid signal line (ADVX) 9 is asserted by the microprocessor when the multiplexed bus 4 is carrying address information. This signal is typically used to latch the address information from the address bus 2 and the multiplexed bus 4 into a latching device at the memory.

In a later part of the memory access, the address bus 2 is unused, while the multiplexed bus 4 is used to convey a data word per clock cycle. Four data words D0, D1, D2 and D3 are conveyed in series.

The interface also has a flow control mechanism that allows the memory to pace the data transfer by temporarily suspending it. The control bus includes a Ready signal line 11 that is controlled by the memory. The state of the Ready signal indicates whether or not a data word is to be transferred. The Ready signal is asserted high while continuing data transfer is possible and asserted low when continuing data transfer is suspended.

In FIG. 1 a read memory access is illustrated. The transfer of the data word D3 from the memory to the microprocessor is delayed while the Ready signal line 11 is asserted low by the memory. The Ready signal is asserted HIGH as the fourth data word D3 is transferred from the memory.

The Ready signal line 11 enables paced burst mode access to the memory including crossing internal memory page boundaries. In burst mode access the data is read as a burst of words, if necessary from different memory segments used in the internal organization of the memory. The Ready signal can be used to suspend the data transfer while the next memory segment is fetched.

It would be desirable to improve the above-described interface.

BRIEF DESCRIPTION OF THE INVENTION

According to one embodiment of the invention there is provided a method of transferring address information from a controller device to a target device via a multiplexed data/address bus comprising: transferring a first portion of address information in a first phase via the multiplexed data/address bus; transferring a second portion of address information in a second phase via a multiplexed data/address bus, wherein the first and second portions are distinct portions of the address information and the first and second phases are distinct and successive.

According to another embodiment of the invention there is provided a controller device for transferring address information to a target device via a multiplexed data/address bus comprising: timing means for timing a first phase and a second phase following the first phase; addressing means for providing a first portion of address information on the multiplexed data/address bus during the first phase and for providing a second portion of address information on the multiplexed data/address bus during the second phase, wherein the first and second portions are distinct portions of the address information.

According to another embodiment of the invention there is provided a target device for receiving address information transferred from a controller device via a multiplexed data/address bus, the target device comprising: timing means for timing a first phase and a second phase following the first phase; addressing means for storing, in a first predetermined storage location, a first portion of address information received on the multiplexed data/address bus during the first phase and for storing, in a second predetermined storage location, a second portion of address information received on the multiplexed data/address bus during the second phase.

According to another embodiment of the invention there is provided a method of strobing and pacing data transfer between a controller device and a target device using a single control signal, comprising: strobing the transfer of a data word from the target device to the controller device by changing the state of the control signal as the data word is transferred; and pacing a transfer of data words from the target device to the controller device by disabling a state change of the control signal.

According to another embodiment of the invention there is provided a target device for transferring data between a controller device and the target device, the target device comprising: an interface comprising a bus for transferring data between the target device and the controller device and a control signal line for providing a control signal to the controller; and flow control means for strobing the transfer of data to the controller by changing the state of the control signal with each data word provided to the bus and for pacing the transfer of data to the controller by maintaining the state of the control signal.

According to another embodiment of the invention there is provided controller device for transferring data between a controller device and the target device, the controller device comprising: an interface comprising a bus for transferring data between the target device and the controller device and a control signal line for receiving a control signal from the target device; and flow control means for latching a data word provided on the bus by the target device only when the state of the control signal changes.

According to another embodiment of the invention there is provided a method of strobing and pacing data transfer between a controller device and a target device using a single control signal, comprising: strobing a data transfer from the target device to the controller by changing the state of the control signal with each data transfer; and pacing a data transfer from the controller to the target by changing the state of the control signal.

According to another embodiment of the invention there is provided a method of performing a burst read access at a memory device using a multiplexed data/address bus and a control signal comprising: transferring a first portion of address information in a first phase via the multiplexed data/address bus to the memory device; transferring second portion of address information in a second phase via a multiplexed data/address bus to the memory device; transferring a series of data words from the memory via the multiplexed data/address bus; toggling the state of the control signal at the memory device as each data word is transferred; and suspending the transfer of the series of data words from the memory via the multiplexed data/address bus and the toggling of the state of the control signal.

Embodiments of the invention therefore provide a higher performance controller device/target device interface that has either a reduced number of signal lines or has a wider data bus.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 2:
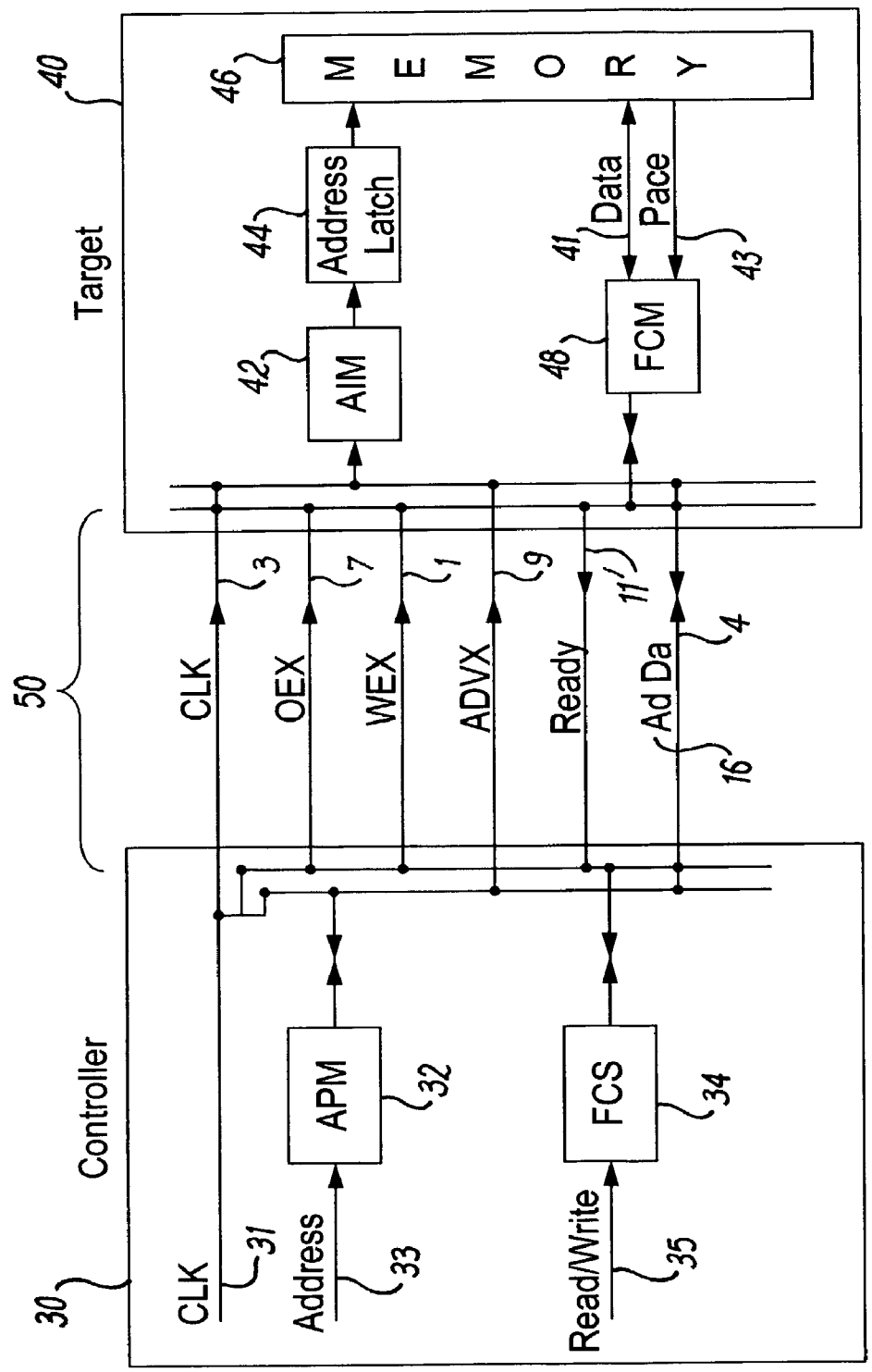
FIG. 2 illustrates a controller device and a target device connected via interface.

FIG. 2 illustrates a controller device 30 and a target device 40 connected via interface 50. The controller 30 device is typically a microprocessor, ASIC or other type of integrated circuit controller than is able to write to and read from the target device which is typically a memory device. The interface 50 connecting the controller 30 and target 40 is new. Only as many signal lines in the interface 50 will be describe as is necessary to understand the novel aspects of its operation. The interface 50 may comprise additional unspecified signal lines that operate in a conventional fashion.

The interface 50 comprises: an N-bit multiplexed data/address bus 4 that operates a double rate, and a control bus 6 comprising a system clock signal line (external clock) 3, a read signal line (OEX) 7, a write enable signal line (WEX) 1, an address valid signal line (ADVX) 9 and a Ready signal line 11'. The interface 50 does not comprise a dedicated address bus The interface 50 uses a new multi-phase addressing mode. Instead of simultaneously providing the address information via a dedicated address bus and the multiplexed bus in a single transfer process at the rising edge of the clock cycle, the interface 50 provides the address information only via a multiplexed bus 4 in a sequence of successive transfer processes.

The address transfer may be at 'double rate' in which two phases of address information are driven onto the multiplexed bus 4 in one external clock cycle. A first address transfer phase occurs at the rising edge of a first clock cycle and a second address transfer phase occurs at the falling edge of the first clock cycle. The first address transfer phase transfers N bits and the second address transfer process transfers up to N bits. The least significant bits of the address information are transferred in the first phase. This allows a single phase short address mode to be used in which only the least significant bits of the address are transferred in the first phase and the most significant bits of the address are re-used from the previous access.

The interface 50 also has a flow control mechanism that allows the target 40 to pace the data transfer during a write access or a read access by temporarily suspending the transfer. This enables paced burst mode access to the target 40, including crossing internal memory page boundaries. In burst mode memory access the data is read/written as a burst of words, if necessary from/to different memory segments used in the internal organization of the memory. The flow control can be used to suspend the data transfer while the next memory segment is fetched/accessed.

The interface 50 also has a strobe mechanism that decouples the response of the target 40, in time, from the request from the controller 30 during a read access. This overcomes the problem of relative clock delays between the controller 30 and target 40 which become more critical as the data transfer rate is increased. This allows the new interface 50 to operate at higher data transfer rates. The strobe mechanism in the target 40 produces a strobe signal that is synchronous with the transferred data. It is consequently received by the controller 30 at the same time as the transferred data is provided on the multiplexed bus 4. The controller 30 comprises a latch mechanism operated by the strobe signal that latches the transferred data.

Both the flow control mechanism and strobe mechanism during a read use the Ready signal 11' and the flow control mechanism during a write uses the Ready signal 11'.

As in the prior art the Ready signal 11' is controlled by the memory. However, during a read access, an absence of a state transition of the Ready signal 11' is used for data pacing (as opposed to the state of the Ready signal in the prior art) and a state transition of the Ready signal 11' is used as a strobe signal for clocking the transferred data into the controller 30. During a write access, the state of the Ready signal 11' is used for data pacing (as in the prior art).

Figure 1:
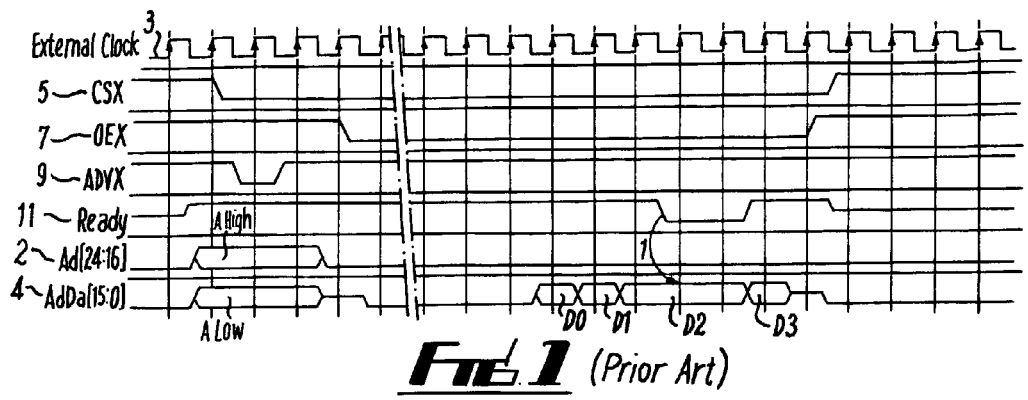
FIG. 1 illustrates a prior art read memory access.

The controller 30 comprises an address provider mechanism 32 and a flow control slave 34. The address provider mechanism 32 receives the address information 33 as an input and is connected via the interface 50 to the external clock signal line 3, the address valid signal line 9 and the multiplexed bus 4 as schematically illustrated in FIG. 1. The flow control slave receives a control signal 35 that indicates whether the access using the address information should be a read access or a write access. It is also connected via the interface 50 to the external clock signal line 3, the write enable signal line WEX 1, the read enable signal line OEX 7, the Ready signal line 11' and the multiplexed bus 4.

The target 40 comprises an address interpreter mechanism 42, an address latch 44, memory circuitry 46 and a flow control master 48. The address interpreter mechanism 42 is connected to the external clock signal line 3, the address valid signal line ADVX 9 and the multiplexed bus 4 as schematically illustrated in FIG. 1. The flow control master 48 is connected to the external clock signal line 3, the write enable signal line WEX 1, the read enable signal line OEX 7, the Ready signal line 11' and the multiplexed bus 4. It is also connected to receive an internal data pace signal 43 from the memory circuitry if the read or write operation is delayed and to transfer data to and from the memory 46 via a data bus 41.

Burst Read Access

Figure 3:
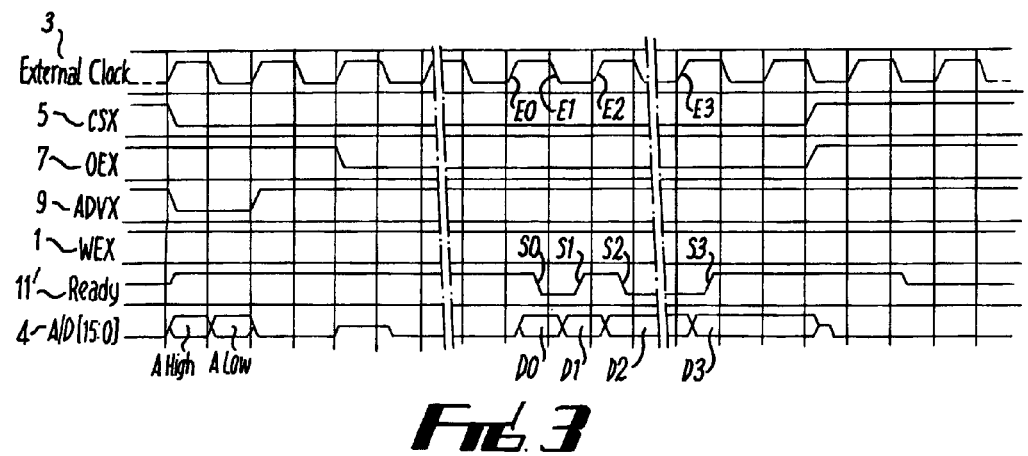
FIG. 3 illustrates a 4 word burst read with pacing.

FIG. 3 illustrates a 4 word burst read with pacing. The Ready signal 11' is used to strobe the data into the controller 30. Each new data word D0, D1, D2, D3 presented to the controller is accompanied by a respective change in state S0, S1, S2, S3, of the Ready signal 11'. The data can be paced by holding the state of the Ready signal 11 and preventing subsequent transitions.

The read burst access begins when the address provider mechanism 32, at the rising edge of a first clock cycle, drives and holds the address valid signal line ADVX LOW and simultaneously drives the N least significant address bits onto the multiplexed bus 4. The address provider mechanism 32, at the falling edge of the same first clock cycle, then drives the remaining address bits onto the multiplexed bus 4 while the address valid signal line ADVX is held LOW. The address provider mechanism 32, at the rising edge of the next clock cycle, then drives and holds the address valid signal line ADVX HIGH indicating the end of the multi-phase address transfer.

The address interpreter mechanism 42 responds to a LOW address valid signal ADVX 9 and a rising edge of the external clock signal 3, by latching the N bits received on the multiplexed bus 4 into the address latch 44 as the N least significant bits. The address interpreter mechanism 42 responds to a LOW address valid signal and a falling edge of the external clock signal, by latching the bits received on the multiplexed bus, if any, into the address latch 44 as the most significant bits.

The flow control master 48 in the absence of a pace signal 43, latches a different data word D0, D1, D2 retrieved from the memory via the data bus 41 onto the multiplexed bus 4 at each edge E0, E1, E2 of the external clock signal and simultaneously toggles the state of the Ready signal The state of the Ready signal at S0 is switched LOW as the first data word D0 is latched onto the multiplexed bus at the rising edge E0 of the external clock signal 3. The Ready signal 11' is the inverse of the external clock signal 3 with a delay.

The flow control slave 34 uses each transition S0, S1, S2 in the Ready signal 11' to latch a different data word D0, D1, D2 from the multiplexed bus 4.

When the pace signal 43 is asserted by the memory circuitry 46, the flow control master 48, continues to latch the current data word D2 on the multiplexed bus 4 and continues to hold the current state (LOW) of the Ready signal 11'.

As there are no transitions in the Ready signal 11', the flow control slave 34 does not latch a data word from the multiplexed bus 4 and the read process is suspended.

When the pace signal 43 is de-asserted the flow control master latches the next data word D3 retrieved from the memory 46 via the data bus 41 onto the multiplexed bus 4 at the next edge E3 of the external clock signal 3 and simultaneously toggles the state of the Ready signal.

Flow control slave uses the transition in the Ready signal S3 to latch the data word D3 from the multiplexed bus 4.

In the above described example, a non-return to zero Ready signal 11' is used. The Ready signal can consequently be held in either a HIGH or LOW state. This allows data transfers of any length to be paced at any point.

An alternative, although less preferred implementation, uses a return to zero Ready signal 11' is used. The Ready signal can consequently only be held in a LOW state. In this implementation the data must be transferred in word pairs as pacing can only occur when the Ready signal 11' is LOW.

Burst Write Access.

Figure 4:
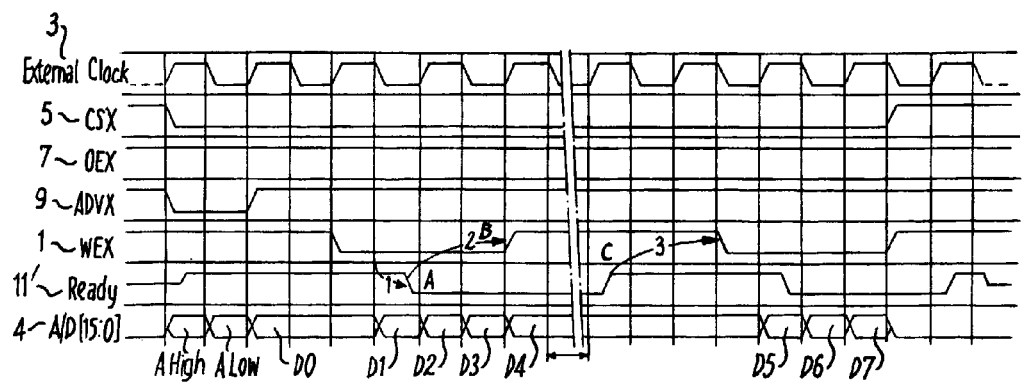
FIG. 4 illustrates an 8 word burst write with pacing.

FIG. 4 illustrates an 8 word burst write with pacing The state of the Ready signal 11' is used to pace data into the target 40. A LOW state will suspend future data transfers to the target 30 and a HIGH state will enable future data transfers to the target 30.

The write burst access begins when the address provider mechanism 32, at the rising edge of a first clock cycle, drives and holds the address valid signal line ADVX LOW and simultaneously drives the N least significant address bits onto the multiplexed bus of width N. The address provider mechanism 32, at the falling edge of the same first clock cycle, then drives the remaining address bits onto the multiplexed bus of width N while the address valid signal line ADVX is held LOW. The address provider mechanism 32, at the rising edge of the next clock cycle, then drives and holds the address valid signal line ADVX HIGH indicating the end of the address transfer.

The address interpreter mechanism 42 responds to a LOW address valid signal ADVX 9 and a rising edge of the external clock signal 3, by latching the N bits received on the multiplexed bus 4 into the address latch 44 as the N least significant bits. The address interpreter mechanism 42 responds to a LOW address valid signal ADVX 9 and a falling edge of the external clock signal 3, by latching the bits received on the multiplexed bus 4, if any, into the address latch 44 as the most significant bits.

The flow control slave 32 in the controller 30 starts the transfer of data by asserting WEX LOW at a rising edge of the external clock signal 3 and then clocking data words D0, D1, D2, D3, D4 onto the multiplexed bus one at a time at each successive edge of the external clock signal 3.

When the pace signal 43 is asserted by the memory circuitry 46, the flow control master 48, stops the data transfer by de-asserting the Ready signal 11' by making it LOW at point A in the Fig.

The flow control slave 34 responds to the LOW Ready signal 11' by stopping the data transfer by de-asserting the write enable signal WEX at point B in the Fig. It should be appreciated that the halting of data transfer after a change in state of the Ready signal 11' is not instantaneous. The halting of data transfer (point B) is delayed relative to the change of state of the Ready signal 11' (point A) by one external clock cycle in this example.

When the pace signal is de-asserted at point C, some time later, the flow control master 48 restarts the data transfer by re-asserting the Ready signal 11' by holding it HIGH.

The flow control slave 34 responds to the HIGH Ready signal 11' by starting data transfer by asserting the write enable signal WEX 1 at point D. It should be appreciated that the re-starting of the data transfer after a change in state of the Ready signal is not instantaneous. The re-start of data transfer (point D) is delayed relative to the change of state of the Ready signal 11' (point C) by one external clock cycle in this example.

Although embodiments of the present invention have been described in the preceding paragraphs with reference to various examples, it should be appreciated that modifications to the examples given can be made without departing from the scope of the invention as claimed. For example although the multi-phase transfer of the address information and the transfer of the data between the controller and target has been described using 'double rate' transfer, in which a transfer occurs twice with each external clock cycle e.g. at each edge of the clock cycle, other embodiments of the invention may use 'single rate' transfer, in which a transfer occurs only once with each external clock cycle e.g. only with the rising edge of the external clock signal or, alternatively, only with the falling edge of the rising clock.

In addition, although the multi-phase transfer of an address has been illustrated using a two-phase transfer, it should be appreciated that N phases can be used where N is a natural number greater than 1.

Although in the interface described above the first phase, for transferring a first portion of the address, is initiated at a first rising clock edge and the second phase, for transferring a second portion of the address, is initiated at a second rising clock edge, in other implementations the first phase is initiated at a first falling clock edge and the second phase is initiated at a second falling clock edge. The first falling clock edge and second falling clock edge are successive adjacent clock edges in a single clock cycle.

We claim:

1. A method of strobing and pacing data transfer between a controller device and a target device using a control signal, comprising:
    strobing the transfer of a data word over a data bus from the target device to the controller device by changing as the data word is transferred the state of a signal line, in response to a state change of an external clock, to provide the control signal wherein the signal line is distinct from the data bus and the external clock; and
    pacing an on-going transfer of data words from the target device to the controller device by disabling a state change of the signal line without disabling ongoing state changes of the external clock, wherein disabling a state change in the signal line can occur while the signal line is in any state.

2. A method as claimed in claim 1, wherein the target device is configured to control the state of the signal line.

3. A method as claimed in claim 1, wherein the method comprises, during a burst read, strobing the transfer of a series of data words from the target device to the controller device by changing the state of the signal line as each data word is transferred and pacing the transfer of the series of data words from the target device to the controller device by disabling state change of the signal line.

4. A method as claimed in claim 1, wherein the method comprises, during a burst write, pacing the transfer of data words from the controller device to the target device by changing the state of the signal line at the target device.

5. A target device configured to transfer data between a controller device and the target device, the target device comprising:
    an interface comprising a data bus configured to transfer data between the target device and the controller device, a signal line configured to provide a control signal to the controller device and an external clock signal line, wherein the signal line is distinct from the data bus and the external clock signal line; and
    a strobe mechanism configured to strobe the transfer of data to the controller device over the data bus by changing the state of the signal line, in response to a state change of the external clock signal line, with each data word provided to the bus and a flow control mechanism configured to pace an on-going transfer of data to the controller device by maintaining the state of the signal line without ongoing changes of the external clock signal line being disabled, wherein the flow control mechanism is configured to maintain the state of the signal line in any state.

6. A target device as claimed in claim 5, wherein the bus is a multiplexed data/address bus.

7. A target device as claimed in claim 5, wherein the flow control mechanism is additionally configured to pace the transfer of data from the controller by changing the state of the signal line.

8. A target device as claimed in claim 5, configured to operate as a memory device.

9. A target device as claimed in claim 5, wherein pacing an on-going transfer of data words from the target device to the controller device is achieved by disabling a state change of the signal line.

10. A controller device configured to transfer data between the controller device and a target device, the controller device comprising:
    an interface comprising a data bus configured to transfer data between the target device and the controller device, a signal line configured to receive a control signal from the target device and an external clock signal line, wherein the signal line is distinct from the data bus and the external clock signal line; and
    a flow control mechanism configured to latch a data word provided on the bus by the target device during an on-going transfer of data words only when the state of the signal line changes, wherein the state of the signal line changes in response to a state change of the external clock signal line, and wherein the flow control mechanism is configured not to latch a data word if the state of the signal line is maintained in any state without ongoing state changes of the external clock signal line being disabled.

11. A controller device as claimed in claim 10, wherein the bus is a multiplexed data/address bus.

12. A controller device as claimed in claim 10, wherein the flow control mechanism is configured to suspend the transfer of data to the target device via the bus when the state of the signal line changes.

13. A method of strobing and pacing data transfer between a controller device and a target device using a control signal, comprising:
    strobing a data transfer from the target device to the controller device over a data bus by toggling only with each data transfer the state of a signal line, in response to a state change of an external clock, to provide the control signal wherein a data word is not transferred if the state of the signal line is maintained in any state and without disabling ongoing state changes of the external clock and wherein the signal line is distinct from the data bus and the external clock; and
    pacing an on-going data transfer from the controller device to the target device by changing the state of the signal line.

14. A method of performing a burst read access at a memory device using a multiplexed data/address bus and a control signal comprising:
    transferring a first portion of address information in a first phase via the multiplexed data/address bus to the memory device;
    transferring a second portion of address information in a second phase via the multiplexed data/address bus to the memory device;
    transferring a series of data words from the memory device via the multiplexed data/address bus;
    toggling only as each data word is transferred the state of a signal line, in response to a state change of an external clock, to provide the control signal at the memory device wherein the signal line is distinct from the data bus and the external clock; and suspending an on-going transfer of the series of data words from the memory device via the multiplexed data/address bus and suspending the toggling of the state of the signal line without disabling ongoing state changes of the external clock, by maintaining the signal line in any state.

* * * * *